United States Patent
Morris et al.

(10) Patent No.: US 8,560,434 B2
(45) Date of Patent: Oct. 15, 2013

(54) METHODS AND SYSTEMS FOR SEGMENTATION USING MULTIPLE DEPENDENT VARIABLES

(75) Inventors: Sherri Morris, Lawrenceville, GA (US); Chuck Robida, Roswell, GA (US); Lisa Zarikian, Alpharetta, GA (US)

(73) Assignee: Vantagescore Solutions, LLC, Stamford, CT (US)

( * ) Notice: Subject to any disclaimer, the term of this patent is extended or adjusted under 35 U.S.C. 154(b) by 0 days.

(21) Appl. No.: 11/685,061

(22) Filed: Mar. 12, 2007

(65) Prior Publication Data
US 2007/0255645 A1 Nov. 1, 2007

Related U.S. Application Data (60) Provisional application No. 60/781,138, filed on Mar. 10, 2006, provisional application No. 60/781,052, filed on Mar. 10, 2006, provisional application No. 60/781,450, filed on Mar. 10, 2006.

(51) Int. Cl.
*G06Q 40/00* (2012.01)
*G06Q 40/02* (2012.01)
*G06Q 30/02* (2012.01)

(52) U.S. Cl.
CPC ............ *G06Q 40/00* (2013.01); *G06Q 40/02* (2013.01); *G06Q 40/025* (2013.01); *G06Q 30/0204* (2013.01)
USPC .............................................. 705/38; 705/35

(58) Field of Classification Search
CPC ..... G06Q 40/00; G06Q 40/02; G06Q 40/025; G06Q 30/0204
USPC .................................................... 705/38, 35
See application file for complete search history.

(56) References Cited

U.S. PATENT DOCUMENTS 5,802,142 A  9/1998  Browne
6,202,053 B1 *  3/2001  Christiansen et al. .......... 705/38
(Continued)

FOREIGN PATENT DOCUMENTS

JP  2003016261  1/2003
TW  256569  6/2002
(Continued)

OTHER PUBLICATIONS

Gopalan, R. (1999). Panning for sales-force gold. Intelligent Enterprise, 2(18), 38-43. Retrieved Jun. 7, 2013.*
(Continued)

*Primary Examiner* — Kito R Robinson
(74) *Attorney, Agent, or Firm* — Smith Gambrell & Russell LLP (57) ABSTRACT

Methods and systems for optimal partitioning of segments in a consumer credit segmentation tree comprising defining a first attribute-based independent variable on a first tree using a primary dependent variable having two classes, defining a second attribute-based independent variable on the first tree using the primary dependent variable, defining risk tiers for the first attribute-based independent variable on the first tree using a first risk score and the primary dependent variable, defining risk tiers for the second attribute-based independent variable on the first tree using a second risk score and the primary dependent variable, superimposing the first tree structure, based on the primary dependent variable, onto a second tree, and defining profiles in the risk tiers for the second attribute-based independent variable with a profile dependent variable having two classes, completing the second tree, wherein the second tree is used to segment a population according to credit related behavior.

24 Claims, 4 Drawing Sheets

(56) References Cited

U.S. PATENT DOCUMENTS

| | | | |
|---|---|---|---|
| 6,823,319 B1 | 11/2004 | Lynch et al. | |
| 7,003,476 B1* | 2/2006 | Samra et al. | 705/10 |
| 7,120,599 B2 | 10/2006 | Keyes | |
| 7,308,417 B1* | 12/2007 | Nathan | 705/10 |
| 7,593,892 B2* | 9/2009 | Balk et al. | 705/38 |
| 2001/0039523 A1 | 11/2001 | Iwamoto | 705/35 |
| 2001/0044766 A1 | 11/2001 | Keyes | |
| 2002/0165839 A1 | 11/2002 | Taylor et al. | |
| 2002/0198824 A1 | 12/2002 | Cook | 705/38 |
| 2003/0046223 A1 | 3/2003 | Crawford et al. | 705/38 |
| 2004/0030667 A1 | 2/2004 | Xu et al. | |
| 2004/0044617 A1 | 3/2004 | Lu | |
| 2004/0064402 A1 | 4/2004 | Dreyer et al. | 705/37 |
| 2004/0199456 A1 | 10/2004 | Flint et al. | 705/35 |
| 2005/0086579 A1 | 4/2005 | Leinter et al. | 705/39 |
| 2005/0102226 A1 | 5/2005 | Oppenheimer et al. | |
| 2005/0154664 A1 | 7/2005 | Guy et al. | 705/39 |
| 2005/0278246 A1 | 12/2005 | Friedman et al. | |
| 2005/0279824 A1 | 12/2005 | Anderson et al. | |
| 2006/0129428 A1 | 6/2006 | Wennberg | 705/20 |
| 2006/0178971 A1 | 8/2006 | Owen et al. | 705/38 |
| 2006/0241923 A1 | 10/2006 | Xu et al. | |
| 2006/0242049 A1 | 10/2006 | Haggerty et al. | 705/38 |
| 2006/0242051 A1 | 10/2006 | Haggerty et al. | 705/38 |
| 2006/0282359 A1 | 12/2006 | Nobili et al. | 705/38 |

FOREIGN PATENT DOCUMENTS

| | | |
|---|---|---|
| WO | WO2004/114160 | 12/2004 |
| WO | WO2006/099492 | 9/2006 |

OTHER PUBLICATIONS

Apte, C. V., Natarajan, R., Pednault, E. P. D., & Tipu, F. A. (2002). A probabilistic estimation framework for predictive modeling analytics. IBM Systems Journal, 41(3), 438-448. Retrieved Jun. 7, 2013.*

U.S. Appl. No. 11/685,070, filed Mar. 12, 2007, Inventor: Conlin et al., Title: Methods and Systems for Characteristic Leveling, Response after Non-Final Action, Apr. 5, 2010.

U.S. Appl. No. 11/685,070, filed Mar. 12, 2007, Inventor: Conlin et al., Title: Methods and Systems for Characteristic Leveling, Interview Summary, Feb. 23, 2010.

U.S. Appl. No. 11/685,070, filed Mar. 12, 2007, Inventor: Conlin et al., Title: Methods and Systems for Characteristic Leveling, Non-Final Rejection, Jan. 4, 2010.

U.S. Appl. No. 11/685,070, filed Mar. 12, 2007, Inventor: Conlin et al., Title: Methods and Systems for Characteristic Leveling, Response after Final Action, Oct. 27, 2009.

U.S. Appl. No. 11/685,070, filed Mar. 12, 2007, Inventor: Conlin et al., Title: Methods and Systems for Characteristic Leveling, Final Rejection, Jun. 5, 2009.

U.S. Appl. No. 11/685,070, filed Mar. 12, 2007, Inventor: Conlin et al., Title: Methods and Systems for Characteristic Leveling, Supplemental Responses, Mar. 26, 2009.

U.S. Appl. No. 11/685,070, filed Mar. 12, 2007, Inventor: Conlin et al., Title: Methods and Systems for Characteristic Leveling, Response after Non-Final Action, Feb. 24, 2009.

U.S. Appl. No. 11/685,070, filed Mar. 12, 2007, Inventor: Conlin et al., Title: Methods and Systems for Characteristic Leveling, Non-Final Rejection, Oct. 24, 2008.

U.S. Appl. No. 11/685,070, filed Mar. 12, 2007, Inventor: Conlin et al., Title: Methods and Systems for Characteristic Leveling, Preliminary Amendment, Jul. 16, 2007.

U.S. Appl. No. 11/685,066, filed Mar. 12, 2007, Inventor: K. Robinson, Title: Methods and Systems for Multi-Credit Reporting Agency Modeling, Response after Non-Final Action, Apr. 20, 2010.

U.S. Appl. No. 11/685,066, filed Mar. 12, 2007, Inventor: K. Robinson, Title: Methods and Systems for Multi-Credit Reporting Agency Data Modeling, Mail Non-Final Rejection, Jan. 21, 2010.

U.S. Appl. No. 11/685,066, filed Mar. 12, 2007, Inventor: K. Robinson, Title: Methods and Systems for Multi-Credit Reporting Agency Data Modeling, Response after Non-Final Action, Oct. 27, 2009.

U.S. Appl. No. 11/685,066, filed Mar. 12, 2007, Inventor: K. Robinson, Title: Methods and Systems for Multi-Credit Reporting Agency Data Modeling, Mail Non-Final Rejection, May 27, 2009.

U.S. Appl. No. 11/685,066, filed Mar. 12, 2007, Inventor: K. Robinson, Title: Methods and Systems for Multi-Credit Reporting Agency Data Modeling, Response after Non-Final Action, Feb. 24, 2009.

U.S. Appl. No. 11/685,066, filed Mar. 12, 2007, Inventor: K. Robinson, Title: Methods and Systems for Multi-Credit Reporting Agency Data Modeling, Mail Non-Final Rejection, Oct. 16, 2008.

Jones YD. (2005) Consumers Understood the Basics but Could Benefit from Targeted Educational Efforts. Finance Wire, 2005 CQ Transcripts, Inc., Mar. 16, 2005 (retrieved Jun. 15, 2010).

http://www.merriam-webster.com/dictionary/normalize (retrieved Jun. 14, 2010).

* cited by examiner

METHODS AND SYSTEMS FOR SEGMENTATION USING MULTIPLE DEPENDENT VARIABLES

CROSS REFERENCE TO RELATED PATENT APPLICATIONS

This application claims priority to U.S. Provisional Application No. 60/781,138 filed Mar. 10, 2006, U.S. Provisional Application No. 60/781,052 filed Mar. 10, 2006, and U.S. Provisional Application No. 60/781,450 filed Mar. 10, 2006 herein incorporated by reference in their entireties. Related U.S. Utility application Ser. No. 11/685,066, filed Mar. 12, 2007, by Morris, et al., titled "Methods and Systems for Multi-Credit Reporting Agency Data Modeling" and U.S. Utility application Ser. No. 11/685,070, filed Mar. 12, 2007, by Conlin, et al., titled "Methods and Systems for Characteristic Leveling" are herein incorporated by reference in their entireties.

BACKGROUND

In the context of credit scoring, Credit Reporting Agencies (CRAs) utilize various methods to categorize, or segment, various sub-populations of a population according to credit related behavior and activities. One such method is segmentation. The objective of segmentation is to define a set of sub-populations that when modeled individually and then combined, rank risk more effectively than a single model.

The premise of segmentation is that credit attributes, or characteristics, (independent variables) have a different relationship with risk (dependent variable) for different sub-populations. By identifying the appropriate sub-populations, the attributes, or characteristics, that are most predictive in isolating risk are optimized for that group.

Segmentation using partitions of individual attributes as defined by regression tree analysis has been the traditional methodology used for CRA scores. Ultimately, using the attribute-centric, tree-based approach creates a rank ordering system resulting from a number of nodes (tree endpoints) with differing bad rates. Newer methods incorporate risk-based scores, which are more effective at rank ordering than individual attributes and produce more homogeneous risk sub-populations.

The latest methods incorporate profile scores that categorize individuals into sub-populations that reflect the propensity of an individual to experience a specific type of failure mode, such as bankruptcy or default. Traditional regression tree analysis uses a single dependent variable corresponding to the target dependent variable of the final solution (primary dependent variable). Use of the primary dependent variable, however, may result in the definition of sub-optimal partitions of a profile type score.

SUMMARY

Provided are systems and methods for optimal partitioning of segments in a consumer credit segmentation tree. Segments can be defined based on regression tree analysis.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the method and systems are not limited to specific components and, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present methods and systems may be understood more readily by reference to the following detailed description of preferred embodiments and the Examples included therein and to the Figures and their previous and following description.

I. Segmentation—Generally

The segmentation methods provided can leverage attribute-based segmentation in conjunction with a general risk score and a profile model. A risk score can be, for example, a score that predicts the likelihood that a consumer will repay on a loan or credit card. For example, predicting a likelihood that a consumer misses 2 or more payments, and the like. A profile model is a model that compares characteristics of two groups within a sub-population of an overall population and predicts a likelihood that an individual will be part of one sub-population or another sub-population. The profile model can, for example, identify whether an individual has the profile of someone who will file for bankruptcy or someone who will default (90+ days past due/charge off). The profile model can, however, be adapted to any credit related attribute known in the art.

Segmentation can be a two step process; 1) segment identification and 2) segment testing. Currently, there is no methodology that enables identification of a set of segments and a determination of how a system will perform in one step. To test the effectiveness of a segmentation scheme, a prototype solution can be developed for each scheme to assess the performance improvement.

A. Dependent Variables

The dependent variable for any solution represents the outcome or behavior to be predicted for CRA models; this can be, but is not limited to risk and bankruptcy, response/non-response to a marketing campaign, attrition/non-attrition, and the like.

i. Risk Definition

A risk definition broadly groups individuals into 'good' and 'bad' repayment performance. 'Good' repayment performance can be defined as someone who has not experienced an arrears status more than 30 days past due over the time frame performance is evaluated (outcome period). Conversely 'bad' repayment performance can be defined as someone who has experienced an arrears status greater than or equal 90 days past due inclusive of charge off or bankruptcy filing during the outcome period. One skilled in the art will recognize that the definitions of good and bad performance can vary. For example, the past due period for good can be 30, 60, 90, 120, and the like. By further example, the past due period for bad can be 30, 60, 90, 120, and the like. However, it is recognized that the past due period for good and bad can not be the same value.

The performance definition of the solution to be developed is referred to as the primary dependent variable.

B. Segment Identification

A variety of techniques can be used during the segment identification phase. By way of example, and not limitation, these techniques can include:

Purely heuristic, based on business rules
Supervised, statistical, using only attributes
Supervised, statistical, using only scores
Supervised, statistical, using attributes and scores Segment identification can be performed using statistical and heuristic methods. Examples of the statistical methods include unsupervised (ignore the dependent variable) and supervised (use the dependent variable) methods. Cluster analysis is an example of an unsupervised method, while Classification and Regression Trees (CART) or Chi-squared Automatic Interaction Detector (CHAID) would be examples of supervised methods. Heuristic methods are subjective and are based on the developer's experience or business rules. Heuristic segmentation may be determined or supported by analysis of descriptive statistics.

In an embodiment, a heuristic methodology can be used in conjunction with CART to develop a segmentation scheme. While CART is a statistical method, heuristic decisions can be made within the CART analysis. An example of CART software that can be used includes SPSS AnswerTree®, which can automatically construct regression trees based on statistical parameters for each attribute entered into the analysis, which is consistent with other regression tree software.

C. Segmentation Testing

To test the effectiveness of any segmentation scheme, prototype systems can be developed that approximate the final solution. For each identified segmentation scheme, a unique algorithm can be developed for each segment. Using a logistic regression, the sub-populations for each scheme can be re-combined and the individual segment scores can be interpreted across the total population. An algorithm can also be developed on the entire population (no segmentation) and used as a benchmark to compare the effectiveness of the identified segmentation schemes.

Standard statistical tests, such as the Kolmogorov-Smirnov or GINI, can be used to assess the effectiveness of the segmentation schemes relative to each other and the un-segmented benchmark algorithm. The scheme with greatest improvement of the test statistic can be promoted to the development of the final algorithm.

D. Independent Variables for Segment Identification i. Attribute-Based Independent Variables In an embodiment, the present methods and systems can utilize independent variables such as: a previous bankruptcy flag (yes, no), the number of trades (for example, a loan, a credit card, and the like), age of oldest account on file, worst performance of an account on a credit report, age of a consumer, income of a consumer, and the like.

For example, previous bankruptcy can be an independent variable defined using information from the public records information segment and the trade (account) segment of a CRA report. Any individual who had a petitioned, dismissed, or discharged public record bankruptcy or had any trade that a creditor reported as bankrupt as of the observation point (the snapshot credit data prior to the performance evaluation) can be classified as a previous bankruptcy. This was the first level of the segmentation tree, which was heuristically selected.

For example, thin file can be an independent variable defined as anyone who did not have previous bankruptcy and had one or two trades as of the observation point. Analysis of the number of trades in CART produced a thin definition of 1 to 10 trades. If deemed too broad a definition, a heuristically derived thin file split can be used.

For example, full file can be an independent variable defined as the compliment of previous bankruptcy and thin file, and can be defined as having no previous bankruptcy and 3 or more trades. The previous bankruptcy, thin and full file branches must be mutually exclusive and exhaustive of the development database.

ii. Score-Based Independent Variables

Scores can be developed using several different dependent variables for use as independent variables for segment identification. Typically, a score is developed based on the primary dependent variable (for example, good-current to 30 days past due, bad-90+ days past due/charge-off), although scores may be developed on variations of primary dependent variable, such as bankrupt/not bankrupt. Scores developed on the primary dependent variable and used in CART result in segments with the most significant separations of the dependent variable.

Scores can be rationalized for logical validity and political correctness prior to being used for segment identification; hence, scores used for segmentation can be used as stand-alone risk assessment tools.

iii. Profile Model-Based Independent Variables

The profile model is a non-traditional score that can be leveraged for segmentation analysis. The profile model is a departure from traditional CRA or segmentation scores in that only individuals who are components of the 'bad' group (of the primary dependent variable) are used for the score development.

A profile model can contrast the characteristics of individuals who file for bankruptcy versus those who go to default (90+ days past due or charge off). The 'good' group of the primary dependent variable is excluded from the analysis, because by definition they have not filed bankruptcy or gone to default.

The model can be logically validated and refined with respect to the bankrupt/default dependent variable to ensure a stable model. However, with respect to the primary dependent variable (risk), the model will not necessarily be logically valid and as such may not rank risk.

This technique can be used to profile other factors that differentiate bad accounts, such as who is likely to be bad on an installment account versus who is likely to be bad on a revolving account.

Although the score is developed only on the 'bad' group (of the primary dependent variable) the score can be applied to the entire population to create the various segments.

II. Segmentation—Multiple Dependent Variables Utilizing Optimal Score Cuts

A. Methods

Figure 1:
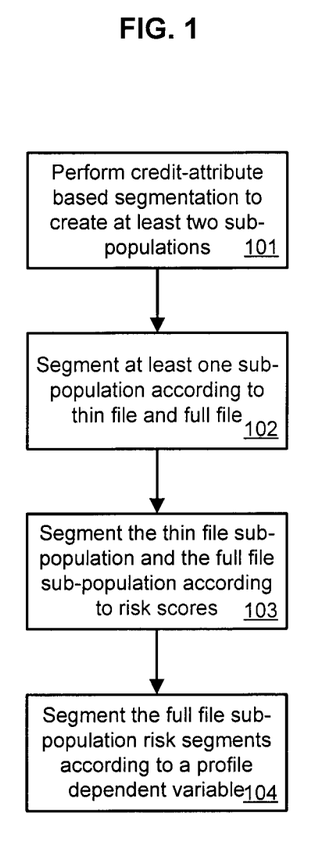
FIG. 1 is an exemplary segmentation method for segmenting a population based on multiple dependent variables including attributes, risk scores and a profile model.

FIG. 1 provides an exemplary segmentation method for segmenting a population based on multiple dependent variables including attributes, risk scores and a profile model. At block 101, credit-attribute based segmentation can be performed to create at least two sub-populations based on a primary dependent variable. Then, at block 102, at least one sub-population can be segmented according to thin file and full file distinctions based on a primary dependent variable. The result of blocks 101 and 102 is a first level of segment branches including previous bankruptcy, thin and full file. Thin and full file splits can be performed on the portion of the population with no previous bankruptcy based on a primary dependent variable. At block 103, the thin file sub-population and the full file sub-population can be segmented according to risk scores based on a primary dependent variable. Regression tree analysis can be used to define risk tiers within the previous bankruptcy, thin and full file branches based on a primary dependent variable. Previous bankruptcy and thin file branches each can have two risk tiers, while full file branch can have four risk tiers. Then, at block 104, the full file sub-population risk segments can be segmented according to a profile model and profile dependent variable. The resulting final level of segmentation can divide the four full file risk tiers into bankrupt and default profile pairs.

The objective of regression tree analysis is to determine the value of an independent variable that is most significant in separating the different groups of the dependent variable ('bad' and 'good'). The analysis attempts to minimize the misclassification of 'goods' in the 'bad' group and the 'bads' in the 'good' group.

Since regression tree analysis uses a single dependent variable, the value selected to partition the profile score, based on the primary dependent, will be sub-optimal with respect to the dependent variable (bankrupt/default) used to develop the profile model.

B. Scheme

Figure 2:
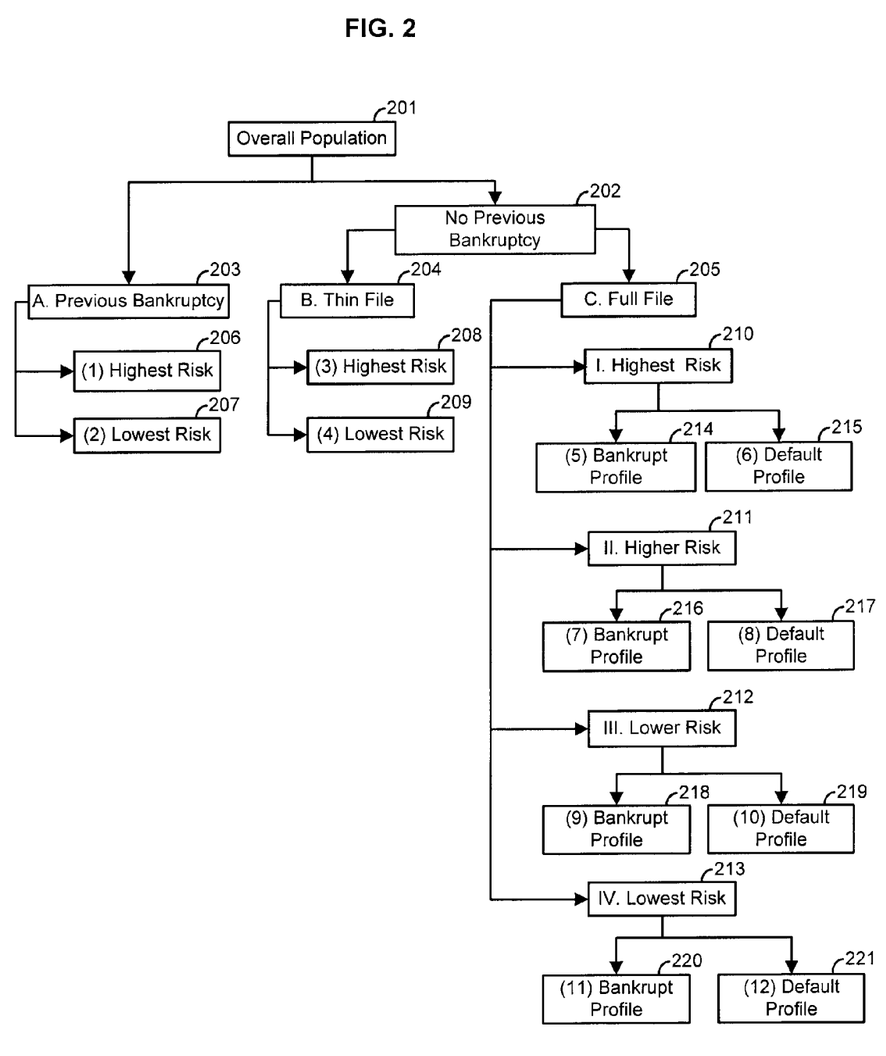
FIG. 2 is an example of a segmentation scheme that can be produced by the method.

The resultant exemplary segmentation scheme, as shown in FIG. 2, can comprise a twelve model suite of scorecards that used credit attributes, risk scores, and a bankrupt/default profile model to define the segments. The overall population of consumers 201, can be divided into consumers with no previous bankruptcy 202 and consumers with a previous bankruptcy 203. The consumers with no previous bankruptcy 202 can be divided into consumers with a thin file 204 and consumers with a full file 205. The consumers with a previous bankruptcy 203, consumers with a thin file 204, and consumers with a full file 205 can be segmented according to risk scores. This segmentation results in consumers with a previous bankruptcy 203 being segmented into highest risk 206 and lowest risk 207. Thin file 204 consumers are segmented into highest risk 208 and lowest risk 209. Full file 205 consumers are segmented into highest risk 210, higher risk 211, lower risk 212, and lowest risk 213. Consumers in highest risk 210, higher risk 211, lower risk 212, and lowest risk 213 can be further segmented according to a profile model. For example, a profile model wherein a consumer matches either a bankrupt profile or a default profile. This segmentation can result in highest risk 210 being divided into bankrupt profile 214 and default profile 215. Higher risk 211 can be divided into bankrupt profile 216 and default profile 217. Lower risk 212 can be divided into bankrupt profile 218 and default profile 219. Lowest risk 213 can be divided into bankrupt profile 220 and default profile 221.

III. Exemplary Segmentation with CART

A first tree can be defined using a primary dependent variable (for example, a bad/good flag). The levels of the tree can be defined using an additional dependent variable, resulting in a first tree. A second tree can be defined based on a secondary dependent variable and the first tree can be superimposed onto the second tree. The remaining branches of the second tree can be developed based on the secondary dependent variable. The second tree can be used to segment a population according to credit related behavior.

For example, previous bankruptcy, thin and full file can be defined heuristically. Initially, the various risk scores (risk 1, risk 2 and bankruptcy) can be evaluated for several different scenarios considering single scores and combination of scores; all segments beyond previous bankruptcy, thin, and full can be defined in CART using the primary dependent variable for supervision. In some cases the variables that were most significant in segmenting the sub-populations can be superseded by scores heuristically selected.

Two risk tiers each can be identified for previous bankruptcy and thin file splits. The risk score using the non-bankrupt bad flag (risk score 2) can produce the most improvement in performance for those two branches. For the full file branch, the risk score developed on the primary dependent variable can be used to produce four risk tiers.

Segments can be defined based on CART using the primary dependent variable and a second dependent variable to optimize the bankrupt/default split. CART analysis for the bankrupt/default profile score can involve developing the first part of the tree using the primary dependent variable (good, bad). The analysis can be recreated using the bankrupt/default dependent variable with the first part of the tree developed on the primary dependent variable manually reproduced on the bankrupt/default flag (typically CART analysis only considers one dependent variable per analysis). CART can be used to define the bankrupt/default segments using the profile score on the bankrupt/default flag for each of the four full file risk tiers. The final portion of the tree (bankrupt/default nodes) can be determined considering only the bad accounts (of the primary dependent variable). Accounts current to 60 days past due can be excluded from the analysis.

A. CART Methods

Figure 3A:
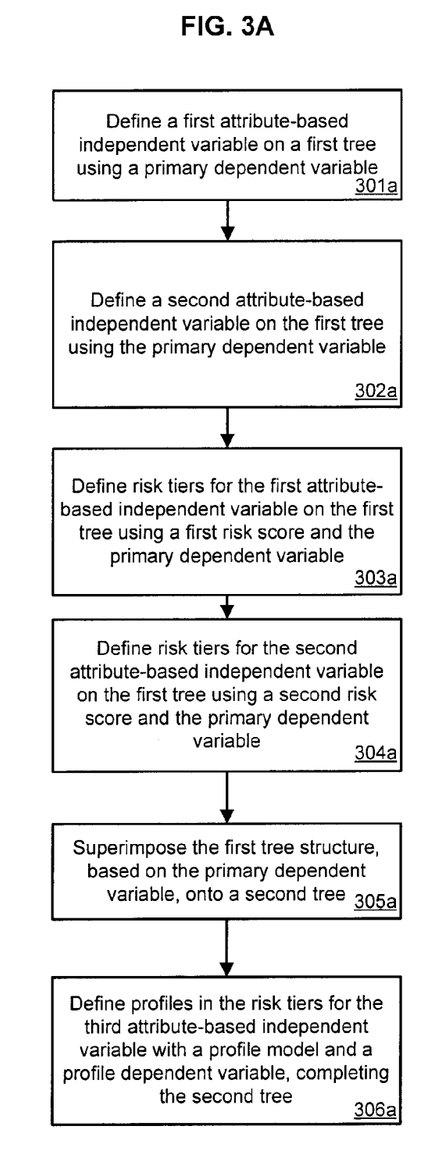
FIG. 3A is exemplary segmentation method for segmenting a population based on multiple dependent variables.

FIG. 3A illustrates steps in an exemplary segmentation method for segmenting a population based on multiple dependent variables. At blocks conducting definitions, definition can occur manually or empirically. At block 301a, define a first attribute-based independent variable on a first tree using a primary dependent variable. At block 302a, define a second attribute-based independent variable on the first tree using the primary dependent variable. At block 303a, define risk tiers for the first attribute-based independent variable on the first tree using a first risk score and the primary dependent variable. At block 304a, define risk tiers for the second attribute-based independent variable on the first tree using a second risk score and the primary dependent variable. At block 305a, superimpose the first tree structure, based on the primary dependent variable, onto a second tree. At block 306a, define profiles in the risk tiers for the second attribute-based independent variable with a profile model and a profile dependent variable, completing the second tree.

The first attribute-based independent variable can be bankrupt/default. The second attribute-based independent variable can be not previously bankrupt and thin file/full file. The primary dependent variable can be good/bad, wherein a consumer is good if the consumer has not experienced an arrears status more than 30 days past due over a predetermined time period. The profile dependent variable can be bankrupt/default wherein characteristics of consumers who file for bankruptcy versus those who go to default are used to classify a consumer as more likely to file bankruptcy or default. The first risk score can be good/non-bankrupt bad. The second risk score can be good/non-bankrupt bad.

Defining a first attribute-based independent variable on a first tree using a primary dependent variable can comprise selecting a value of the first attribute-based independent variable that creates two groups that minimize misclassification of the two classes of the primary dependent variable.

Defining risk tiers can comprise selecting values of a score based independent variable that creates two groups that minimize misclassification of the two classes of the primary dependent variable.

Superimposing the first tree structure, based on the primary dependent variable, onto a second tree can comprise overlaying the first tree structure onto a second tree.

Defining profiles in the risk tiers can comprise selecting values of a profile model that creates two groups that minimizes misclassification of the two classes of the profile dependent variable.

Figure 3B:
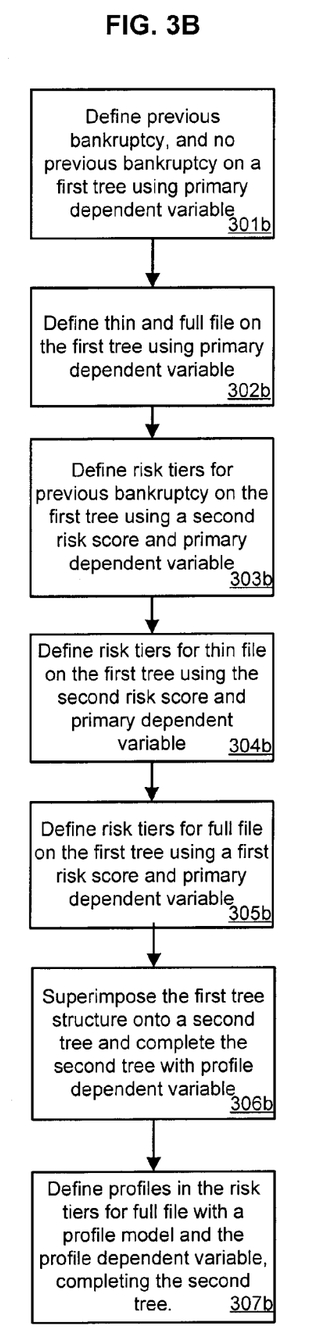
FIG. 3B is exemplary CART segmentation method for segmenting a population based on multiple dependent variables including attributes, risk scores and a profile model.

FIG. 3B illustrates steps in an exemplary CART method. At blocks conducting definitions, definition can occur manually or empirically. At block 301b, define previous bankruptcy and no previous bankruptcy on a first tree using a primary dependent variable (good, bad). At block 302b, define thin and full file on the first tree using the primary dependent variable (good, bad). At block 303b, define risk tiers for previous bankruptcy on the first tree using a risk score (good, non-bankrupt bad) and the primary dependent variable (good, bad). At block 304b, define risk tiers for thin file on the first tree using a risk score (good, non-bankrupt bad) and the primary dependent variable (good, bad). At block 305b, define risk tiers for full file on the first tree using a risk score (good, bad) and the primary dependent variable (good, bad). At block 306b, superimpose the first tree structure, based on the primary dependent variable, onto a second tree. At block 307b, define profiles in the risk tiers for full file with a profile model and the profile dependent variable, completing the second tree. The profile dependent variable can be, for example, bankrupt/default.

Blocks 301b to 305b can be defined within the CART analysis based on the primary dependent variable with the objective of minimizing the misclassification of the 'goods' in the 'bad' group and the 'bads' in the 'good' group. Since previous bankruptcy, thin and full can be heuristic decisions, the attributes (previous bankruptcy and the number of trades) can be manually selected, as well as the partitioning value.

The CART software can be used to define the most significant, or optimum, values of the segmentation risk score to differentiate the bad and good groups of the primary dependent variable. However, use of the primary dependent variable to define the partitioning value of the profile score will not necessarily minimize the misclassification of bankrupt and default profile, which is the objective of the profile score.

To define the optimum partitioning value for the profile scores with respect to the bankrupt/default dependent variable, the primary dependent variable must be replaced. Given that CART only accommodates a single dependent variable, a new tree must be developed based on the bankrupt/default dependent variable. Since the bankrupt/default definition would produce sub-optimal partitioning values for the risk tiers, the tree based on the primary dependent variable, must be superimposed on the tree based on the bankrupt/default dependent variable.

By superimposing the tree based on the primary dependent variable, the individuals in bankrupt and default groups are classified into the appropriate risk tiers. The optimum portioning values to minimize misclassification of bankrupt and default are then defined on the bankrupt/default dependent variable.

The tree-structure developed using the primary dependent variable and the bankrupt default dependent variable is applied to the entire population, such that the segments are mutually exclusive and exhaustive across the entire population.

There is no rule as to the order of the dependent variable to produce the regression tree. For the present example, the primary dependent variable was used to construct the second levels of the tree (first level was defined heuristically), while the bankrupt/default dependent variable was used to generate the final nodes. The analysis order can be switched, such that the bankrupt/default dependent variable can be used to define the second levels of the tree and the primary variable can be used to complete the tree.

B. Results

The CART segmentation method can be performed on a multi-CRA data set having normalized attributes (characteristics). Table I shows the breakdown of the population percentages, overall bad rates, default rates (90+ days past due to charge-off) and bankruptcy rates for the different segmentation levels and end nodes upon which segment scorecards were developed, as observed.

TABLE I

| SEGMENT | % TOTAL | BAD RATE | DEFAULT RATE | BANK-RUPTCY RATE |
|---|---|---|---|---|
| A. Previous Bankruptcy | 5.2% | 16.60% | 11.30% | 5.31% |
| (1) Highest Risk | 1.3% | 35.90% | 26.50% | 9.42% |
| (2) Lowest Risk | 3.8% | 9.89% | 6.02% | 3.88% |
| B. Thin File | 6.1% | 9.88% | 9.37% | 0.51% |
| (3) Highest Risk | 0.9% | 36.10% | 34.30% | 1.77% |
| (4) Lowest Risk | 5.3% | 5.64% | 5.33% | 0.31% |
| C. Full File | 88.7% | 6.42% | 4.52% | 1.89% |
| I. Highest Risk | 10.5% | 32.00% | 24.40% | 7.59% |
| (5) Bankrupt Profile | 3.6% | 31.20% | 17.60% | 13.60% |
| (6) Risk Profile | 6.9% | 32.40% | 27.90% | 4.44% |
| II. Higher Risk | 12.9% | 11.00% | 7.57% | 3.47% |
| (7) Bankrupt Profile | 4.1% | 11.70% | 4.94% | 6.72% |
| (8) Risk Profile | 8.8% | 10.80% | 8.79% | 1.96% |
| III. Lower Risk | 13.0% | 4.09% | 2.29% | 1.80% |
| (9) Bankrupt Profile | 5.5% | 5.11% | 1.86% | 3.25% |
| (10) Risk Profile | 7.5% | 3.34% | 2.61% | 0.73% |
| IV. Lowest Risk | 52.3% | 0.73% | 0.34% | 0.38% |
| (11) Bankrupt Profile | 22.2% | 1.06% | 0.34% | 0.72% |
| (12) Risk Profile | 30.1% | 0.48% | 0.35% | 0.13% |
| Overall | 100.0% | 7.16% | 5.17% | 1.98% |

Individuals with a previous bankruptcy 203 (A) constituted just over five percent of the development sample, however, in order to develop a score, which was effective across a variety of creditor target markets, individuals with a previous bankruptcy where isolated and segmented into highest 206 and lowest risk 207 groups (1 and 2) using a risk segmentation score.

Individuals with a thin file 204 (B) comprised six percent of the development sample and represent a vital target market for most lenders. While the thin file definition of up to two accounts is somewhat restrictive, the segment was defined to ensure that the VantageScore solution was optimized for individuals with limited credit. Individuals with thin files were segmented into highest 208 and lowest risk 209 groups (3 and 4) using a risk segmentation score. Over five percent of the development population consisted of lowest risk 209 thin files (4) with overall bad rates within most creditors' risk tolerance.

The full file 205 segment (C) comprised 88% of the development sample with the lowest risk 213 tier constituting nearly 50% of the development sample, each of the other risk tiers (210, 211, 212) contributed approximately 12% to the development population. The bad rate statistics show that there is very little difference in the overall bad rates of the bankrupt/default profile pairs (214-215, 216-217, 218-219, 220-221) by risk tiers, although the underlying contribution of bankruptcy and default risk is significantly different.

Table II below compares the performance of the present methods and a single model solution as developed on the random development population. The single model solution was logically validated and refined to enable an apples-to-apples comparison of segmented and single model solution.

TABLE II

| SEGMENT | PRESENT METHOD | SINGLE MODEL SOLUTION | DIFFERENCE | % IMPROVEMENT |
|---|---|---|---|---|
| A. Previous Bankruptcy | 44.00 | 41.37 | 2.63 | 6.36% |
| (1) Highest Risk | 25.66 | 22.99 | 2.67 | 11.61% |
| (2) Lowest Risk | 35.22 | 30.72 | 4.50 | 14.65% |
| B. Thin File | 55.01 | 52.77 | 2.24 | 4.24% |
| (3) Highest Risk | 27.56 | 23.13 | 4.43 | 19.15% |
| (4) Lowest Risk | 45.63 | 43.09 | 2.54 | 5.89% |
| C. Full File | 65.45 | 64.10 | 1.35 | 2.11% |
| I. Highest Risk | 28.69 | 25.03 | 3.66 | 14.62% |
| (5) Bankrupt Profile | 29.63 | 24.16 | 5.47 | 22.64% |
| (6) Risk Profile | 28.17 | 25.39 | 2.78 | 10.95% |
| II. Higher Risk | 26.07 | 21.71 | 4.36 | 20.08% |
| (7) Bankrupt Profile | 24.86 | 18.66 | 6.20 | 33.23% |
| (8) Risk Profile | 26.65 | 23.37 | 3.28 | 14.04% |
| III. Lower Risk | 31.63 | 26.37 | 5.26 | 19.95% |
| (9) Bankrupt Profile | 30.23 | 23.68 | 6.55 | 27.66% |
| (10) Risk Profile | 30.80 | 26.67 | 4.13 | 15.49% |
| IV. Lowest Risk | 47.62 | 42.77 | 4.85 | 11.34% |
| (11) Bankrupt Profile | 47.90 | 43.60 | 4.30 | 9.86% |
| (12) Risk Profile | 41.39 | 36.59 | 4.80 | 13.12% |
| Overall | 63.79 | 62.32 | 1.47 | 2.36% |

Significant improvement in performance was observed for each of the bankrupt/default pairs for the four full file risk tiers 210, 211, 212, 213 (I, II, III, & IV), particularly on the bankrupt profile tiers 216 and 218 (7 and 9).

IV. Exemplary Systems

Figure 4:
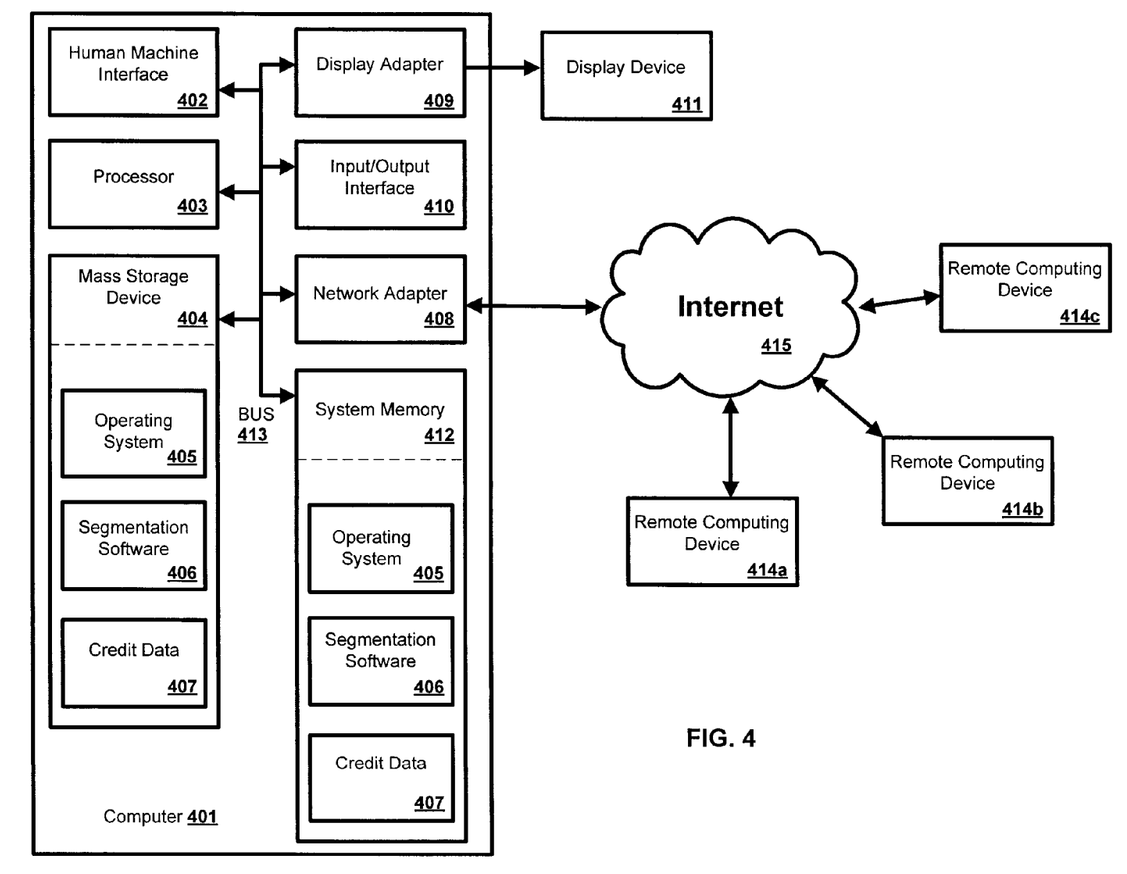
FIG. 4 is an exemplary operating environment.

FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods can be operational with numerous other general purpose or special purpose computing system environments or configurations. Examples of well known computing systems, environments, and/or configurations that may be suitable for use with the systems and methods include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The processing of the disclosed methods can be performed by software components. The disclosed methods may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices. The methods may be practiced utilizing firmware configured to perform the methods disclosed herein in conjunction with system hardware.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The methods disclosed herein can be implemented via a general-purpose computing device in the form of a computer 401. The components of the computer 401 can include, but are not limited to, one or more processors or processing units 403, a system memory 412, and a system bus 413 that couples various system components including the processor 403 to the system memory 412.

The system bus 413 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 413, and all buses specified in this description can also be implemented over a wired or wireless network connection and each of the subsystems, including the processor 403, a mass storage device 404, an operating system 405, segmentation software 406, data 407 (such as credit related data), a network adapter 408, system memory 412, an Input/Output Interface 410, a display adapter 409, a display device 411, and a human machine interface 402, can be contained within one or more remote computing devices 414*a,b,c* at physically separate locations, connected through buses of this form, in effect implementing a fully distributed system.

The computer 401 typically includes a variety of computer readable media. Such media can be any available media that is accessible by the computer 401 and includes both volatile and non-volatile media, removable and non-removable media. The system memory 412 includes computer readable media in the form of volatile memory, such as random access memory (RAM), and/or non-volatile memory, such as read only memory (ROM). The system memory 412 typically contains data such as data 407 and/or program modules such as operating system 405 and segmentation software 406 that are immediately accessible to and/or are presently operated on by the processing unit 403.

The computer 401 may also include other removable/non-removable, volatile/non-volatile computer storage media. By way of example, FIG. 4 illustrates a mass storage device 404 which can provide non-volatile storage of computer code, computer readable instructions, data structures, program modules, and other data for the computer 401. For example, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 404, including by way of example, an operating system 405 and segmentation software 406. Each of the operating system 405 and segmentation software 406 (or some combination thereof) may include elements of the programming and the segmentation software 406. Data 407 can also be stored on the mass storage device 404. Data 407 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 401 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 403 via a human machine interface 402 that is coupled to the system bus 413, but may be connected by other interface and bus structures, such as a parallel port, game port, or a universal serial bus (USB).

A display device 411 can also be connected to the system bus 413 via an interface, such as a display adapter 409. A computer 401 can have more than one display adapter 409 and a computer 401 can have more than one display device 411. For example, a display device can be a monitor, an LCD (Liquid Crystal Display), or a projector. In addition to the display device 411, other output peripheral devices can include components such as speakers (not shown) and a printer (not shown) which can be connected to the computer 401 via Input/Output Interface 410.

The computer 401 can operate in a networked environment using logical connections to one or more remote computing devices 414a,b,c. By way of example, a remote computing device can be a personal computer, portable computer, a server, a router, a network computer, a peer device or other common network node, and so on. Logical connections between the computer 401 and a remote computing device 414a,b,c can be made via a local area network (LAN) and a general wide area network (WAN). Such network connections can be through a network adapter 408. A network adapter 408 can be implemented in both wired and wireless environments. Such networking environments are commonplace in offices, enterprise-wide computer networks, intranets, and the Internet 415.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of segmentation software 406 may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present methods and systems without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented method for optimal partitioning of segments in a consumer credit segmentation tree comprising:

generating by a computer a first attribute-based independent variable on a segmentation tree using a primary dependent variable having two classes, wherein a value of the independent variable is selected that creates two groups that minimize misclassification of the two classes of the primary dependent variable;

generating by the computer a second attribute-based independent variable on the tree using the primary dependent variable;

generating by the computer risk tiers for the first attribute-based independent variable on the tree using a first risk score and the primary dependent variable, wherein values of the independent variable are selected that create two groups that minimize misclassification of the two classes of the primary dependent variable;

generating by the computer risk tiers for a first segment of the second attribute-based independent variable on the tree using the first risk score and the primary dependent variable, wherein values of the independent variable are selected that create two groups that minimize misclassification of the two classes of the primary dependent variable;

generating by the computer risk tiers for a second segment of the second attribute-based independent variable on the tree using a second risk score and the primary dependent variable; and generating by the computer profiles in the risk tiers for the second segment of the second attribute-based independent variable with a profile dependent variable having two classes to complete the tree, wherein values of a profile model are selected that create two groups that minimize misclassification of the two classes of the profile dependent variable.

2. The method of claim 1, wherein the first attribute-based independent variable is bankrupt/default.

3. The method of claim 1, wherein the second attribute-based independent variable is not previously bankrupt and thin file/full file.

4. The method of claim 1, wherein the primary dependent variable is good/bad, wherein a consumer is good if the consumer has not experienced an arrears status more than 30 days past due over a predetermined time period.

5. The method of claim 1, wherein the profile dependent variable is bankrupt/default wherein characteristics of consumers who file for bankruptcy versus those who go to default are used to classify a consumer as more likely to file bankruptcy or default.

6. The method of claim 1, wherein only a portion of the population characterized as bad is used to define the profiles.

7. The method of claim 1, wherein the first risk score is good/non-bankrupt bad.

8. The method of claim 1, wherein the second risk score is good/bad.

9. A system for optimal partitioning of segments in a consumer credit segmentation tree comprising:

a memory configured for storing credit related data comprising the input image;

a processor, coupled to the memory, wherein the processor is configured to perform the steps of:

generating by a computer a first attribute-based independent variable on a segmentation tree using a primary dependent variable having two classes, wherein a value of the independent variable is selected that creates two groups that minimize misclassification of the two classes of the primary dependent variable;

generating by the computer a second attribute-based independent variable on the tree using the primary dependent variable;

generating by the computer risk tiers for the first attribute-based independent variable on the tree using a first risk score and the primary dependent variable, wherein values of the independent variable are selected that create two groups that minimize misclassification of the two classes of the primary dependent variable;

generating by the computer risk tiers for a first segment of the second attribute-based independent variable on the tree using the first risk score and the primary dependent variable, wherein values of the independent variable are selected that create two groups that minimize misclassification of the two classes of the primary dependent variable;

generating by the computer risk tiers for a second segment of the second attribute-based independent variable on the tree using a second risk score and the primary dependent variable; and generating by the computer profiles in the risk tiers for the second segment of the second attribute-based independent variable with a profile dependent variable having two classes to complete the tree, wherein values of a profile model are selected that create two groups that minimize misclassification of the two classes of the profile dependent variable.

10. The system of claim 9, wherein the first attribute-based independent variable is bankrupt/default.

11. The system of claim 9, wherein the second attribute-based independent variable is not previously bankrupt and thin file/full file.

12. The system of claim 9, wherein the primary dependent variable is good/bad, wherein a consumer is good if the consumer has not experienced an arrears status more than 30 days past due over a predetermined time period.

13. The system of claim 9, wherein the profile dependent variable is bankrupt/default wherein characteristics of consumers who file for bankruptcy versus those who go to default are used to classify a consumer as more likely to file bankruptcy or default.

14. The method of claim 9, wherein only a portion of the population characterized as bad is used to define the profiles.

15. The system of claim 9, wherein the first risk score is good/non-bankrupt bad.

16. The system of claim 9, wherein the second risk score is good/bad.

17. A non-transitory computer readable medium with computer executable instructions embodied thereon for optimal partitioning of segments in a consumer credit segmentation tree, the computer executable instructions causing a computer to perform the process of:

generating by a computer a first attribute-based independent variable on a segmentation tree using a primary dependent variable having two classes, wherein a value of the independent variable is selected that creates two groups that minimize misclassification of the two classes of the primary dependent variable;

generating by the computer a second attribute-based independent variable on the tree using the primary dependent variable;

generating by the computer risk tiers for the first attribute-based independent variable on the tree using a first risk score and the primary dependent variable, wherein values of the independent variable are selected that create two groups that minimize misclassification of the two classes of the primary dependent variable;

generating by the computer risk tiers for a first segment of the second attribute-based independent variable on the tree using the first risk score and the primary dependent variable, wherein values of the independent variable are selected that create two groups that minimize misclassification of the two classes of the primary dependent variable;

generating by the computer risk tiers for a second segment of the second attribute-based independent variable on the tree using a second risk score and the primary dependent variable; and generating by the computer profiles in the risk tiers for the second segment of the second attribute-based independent variable with a profile dependent variable having two classes to complete the tree, wherein values of a profile model are selected that create two groups that minimize misclassification of the two classes of the profile dependent variable.

18. The non-transitory computer readable medium of claim 17, wherein the first attribute-based independent variable is bankrupt/default.

19. The non-transitory computer readable medium of claim 17, wherein the second attribute-based independent variable is not previously bankrupt and thin file/full file.

20. The non-transitory computer readable medium of claim 17, wherein the primary dependent variable is good/bad, wherein a consumer is good if the consumer has not experienced an arrears status more than 30 days past due over a predetermined time period.

21. The non-transitory computer readable medium of claim 17, wherein the profile dependent variable is bankrupt/default wherein characteristics of consumers who file for bankruptcy versus those who go to default are used to classify a consumer as more likely to file bankruptcy or default.

22. The method of claim 17, wherein only a portion of the population characterized as bad is used to define the profiles.

23. The non-transitory computer readable medium of claim 17, wherein the first risk score is good/non-bankrupt bad.

24. The non-transitory computer readable medium of claim 17, wherein the second risk score is good/bad.

* * * * *